(12) United States Patent
Garcia

(10) Patent No.: US 9,035,784 B2
(45) Date of Patent: May 19, 2015

(54) CLOCK(S) AS A SEISMIC WAVE RECEIVER

(76) Inventor: Joseph Maanuel Garcia, Spokane, WA (US)

( * ) Notice: Subject to any disclaimer, the term of this patent is extended or adjusted under 35 U.S.C. 154(b) by 544 days.

(21) Appl. No.: 12/589,983

(22) Filed: Oct. 30, 2009

(65) Prior Publication Data

US 2011/0103192 A1    May 5, 2011

(51) Int. Cl.
  *G08B 21/00* (2006.01)
  *G01V 1/18* (2006.01)
(52) U.S. Cl.
  CPC ........................................ *G01V 1/181* (2013.01)
(58) Field of Classification Search
  USPC .............................. 340/690; 702/15; 33/1 HH
  See application file for complete search history.

(56) References Cited

U.S. PATENT DOCUMENTS

| | | | | |
|---|---|---|---|---|
| 3,049,015 A | * | 8/1962 | Johnson ........................... | 73/489 |
| 3,916,371 A | * | 10/1975 | Broding ........................... | 367/78 |
| 4,117,496 A | * | 9/1978 | Sattaripour ........................ | 346/7 |
| 5,144,598 A | * | 9/1992 | Engdahl et al. ................... | 367/181 |
| 5,625,348 A | * | 4/1997 | Farnsworth et al. .......... | 340/690 |
| 5,633,463 A | * | 5/1997 | Szasz .............................. | 73/654 |
| 6,870,482 B2 | * | 3/2005 | Cherry .......................... | 340/690 |
| 7,280,920 B1 | * | 10/2007 | Whiteside et al. .............. | 702/15 |

OTHER PUBLICATIONS

Joseph M. Garcia Disclosure Doc 349407 Mar. 29, 1994 4 Pages U.S.A.
Joseph M. Garcia Disclosure Doc 431952 Feb. 17, 1998 1 Page U.S.A.
Joseph M. Garcia Disclosure Doc 468481 Feb. 3, 2000 1 Page U.S.A.
Tom Bleier & Friedemann Freund "Earth Quake" IEEE Spectrum Dec. 2005 7 Pages U.S.A.

* cited by examiner

*Primary Examiner* — Travis Hunnings
(74) *Attorney, Agent, or Firm* — Lee & Hayes, PLLC

(57) ABSTRACT

A machine for detecting earthquake precursory signals that comprises a spring-loaded balance wheel that is in reality an oscillating seismometer, the oscillating seismometer employed as a local oscillator in a seismic wave receiver. A clock and balance wheel make up the seismic wave receiver which detects the precursory micro-seismic vibrations that precede the earthquake. Extreme sensitivity is accomplished by the immense storage capacity of the clock, for each individual swing of the balance wheel, a miniscule interruption takes place that will go unnoticed but after tens of thousands of swings, which would take place over night for example, a buildup of these interruptions will eventually have their effect.

9 Claims, 4 Drawing Sheets

CLOCK(S) AS A SEISMIC WAVE RECEIVER

BACKGROUND OF THE INVENTION

This invention relates generally to the field of seismology and more specifically to a machine for detecting earthquake precursory signals.

PRIOR TECHNOLOGY

In regards to prior technology reference is made to the paper titled "Earthquake" in the December 2005 issue of the IEEE Spectrum written by Tom Bleier and Friedmann Freund, it was interesting to note that the approximately two week warning period prior to the 1989 Loma Prieta Earthquake of 7.1 magnitude is similar to the approximate two week warning I received prior to the 6.7 magnitude Northridge Earthquake in 1994 and it appears we were monitoring the same frequency range of approximately 1 to 10 Hz and our sensors were located near the immediate area of impact, but that is where the similarity ends.

BRIEF SUMMARY

The Bleier/Freund earthquake detection device as described above was a "magnetometer." The present invention, however, is a spring-loaded balance wheel (an "Oscillating Seismometer") together with the remaining parts of the clock that make up a "Seismic Wave Receiver."

In accordance with a preferred embodiment of the invention, there is disclosed a machine for detecting earthquake precursory signals comprising: A Seismic Wave Receiver, the Seismic Wave Receiver comprising: a spring-loaded balance wheel, the spring-loaded balance wheel employed as a local oscillator, and a clock. The Seismic Wave Receiver can detect earthquake precursory micro-seismic vibrations that precede an earthquake. In some examples, the Seismic Wave Receiver can facilitate exploring for oil, coal, or any other underground minerals or objects, etc.

Other objects and advantages of the present invention will become apparent from the following descriptions, taken in connection with the accompanying drawings, wherein, by way of illustration and example, an embodiment of the present invention is disclosed.

For example, the Seismic Wave Receiver is a simple, inexpensive, and effective device that is capable of providing a warning signal in advance of an earthquake.

BRIEF DESCRIPTION OF THE DRAWINGS

The drawings constitute a part of this application and include exemplary embodiments to the invention, which may be embodied in various forms. It is to be understood that in some instances various aspects of the invention may be shown exaggerated or enlarged to facilitate an understanding of the invention.

Note: Neither the spring-loaded balance wheel nor any part of this clock have been modified or altered in any way.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure, or manner.

This invention relates generally to the field of seismology and more specifically to a machine for detecting earthquake precursory signals. A precursory micro-seismic vibration can be a continuous wave signal that can last for days, weeks, or months, depending on the magnitude of the earthquake that follows. The larger the earthquake magnitude, the longer will be the precursory micro-seismic vibration warning period will last.

The basic unit in a Seismic Wave Receiver is the spring-loaded balance wheel, the pendulum that oscillates rhythmically. When an earthquake is detected the earth rotates, as it were, around the pendulum while the pendulum remains motionless. The precursory micro-seismic vibrations that precede an earthquake can interrupt the rhythmic oscillations of the spring-loaded balance wheel, thereby affecting the clock's time keeping.

The Seismic Wave Receiver can be extremely sensitive to detecting micro-seismic vibrations.

The Seismic Wave Receiver can be a simple, inexpensive, and effective device that is capable of providing a warning signal in advance of an earthquake. The detection of precursory signals up to 30 days in advance of an earthquake magnitude of 6.0 on the Richter scale has been recorded. Detecting precursory signals between two and four weeks in advance of an earthquake can be a normal occurrence.

The Seismic Wave Receiver can have the capability to detect local precursors and also distant precursors throughout the world.

The utility of Seismic Wave Receiver can eliminate complex bore hole mounting techniques.

A quiet remote location is normally not required since the Seismic Wave Receiver is not affected by local transient noise from factories, freeways, airplanes etc.

Figure 1:
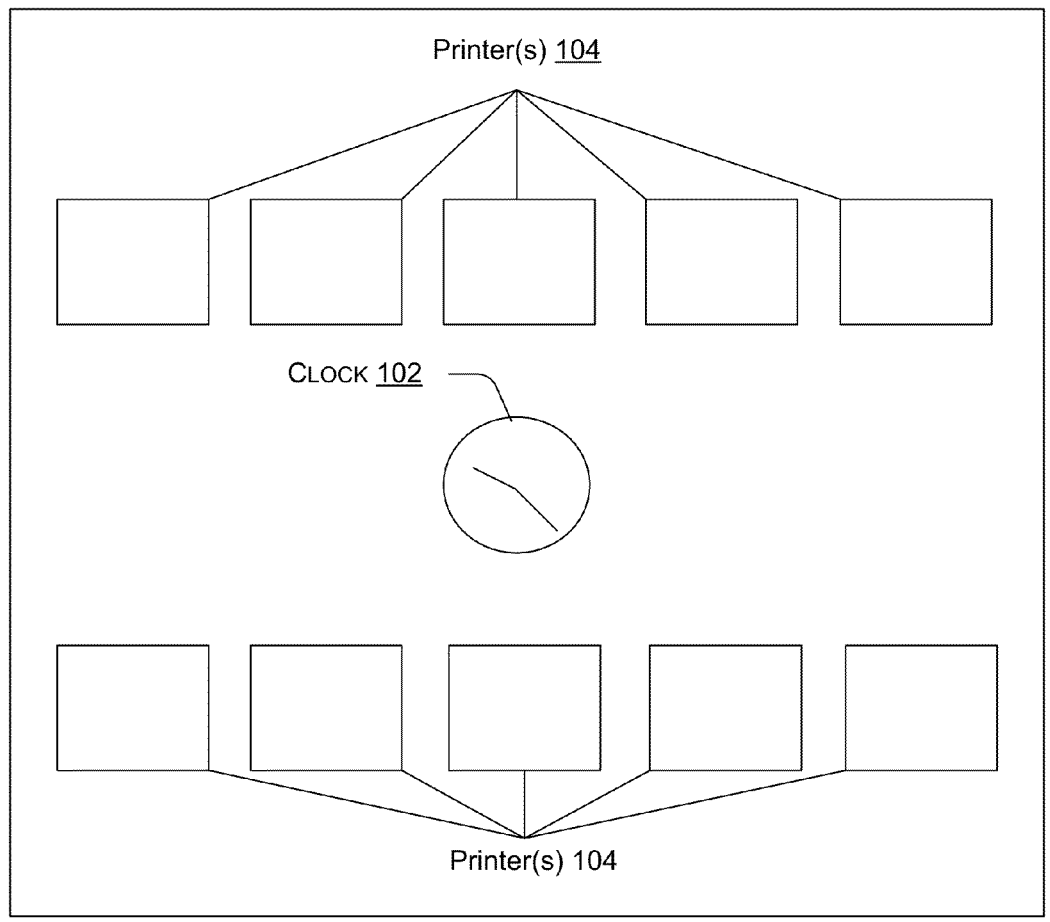
FIG. 1 illustrates an example environment of a Seismic Wave Receiver.

FIG. 1 illustrates an example environment of a Seismic Wave Receiver. In the illustrative example, the Seismic Wave Receiver 102 can be mounted on a wall, and can be accompanied by a plurality of printers 104 for obtaining data. In some embodiments, the Seismic Wave Receiver can be placed on a firm sturdy shelf in order to obtain significant data.

In various examples, a fleet of mobile labs (in motor homes, mobile trailers, etc.) equipped with these detectors could rapidly be dispatched to areas of immediate interest of pending earthquakes.

Figure 2:
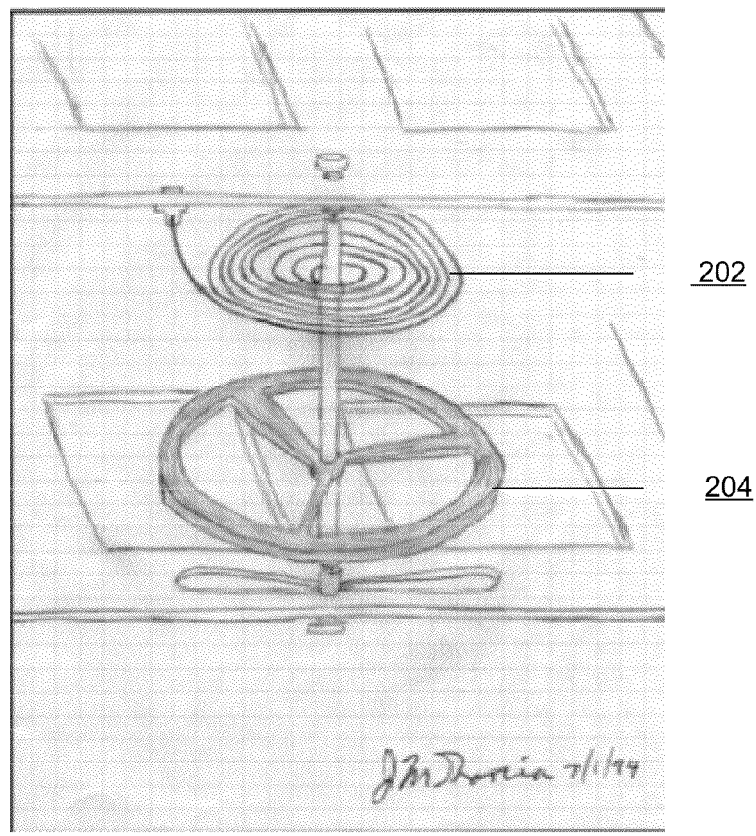
FIG. 2 is a pictorial diagram that illustrates select components of a spring-loaded balance wheel.

The preceding is accomplished in the following manner:

The basic unit in a Seismic Wave Receiver is the spring-loaded balance wheel, the pendulum that oscillates rhythmically. FIG. 2 is a pictorial diagram that illustrates select components of a spring-loaded balance wheel. Micro-seismic vibrations that precede an earthquake can interrupt the rhythmic oscillations of the pendulum and thereby affect the clock's time keeping.

The precursory micro-seismic vibrations (in the frequency range of 1 to 10 Hz) can be a continuous wave signal that lasts for days, weeks, and months depending on the magnitude of the earthquake that follows; the greater the magnitude the longer the warning period.

A further clarification will be realized from the foregoing analogy:

A Seismic Wave Receiver can be a clock and a spring-loaded balance wheel 200.

The clock can be analogous to a radio receiver. A balance wheel 202 can act as a local oscillator, oscillating at a rate determined by a balance spring 204. The micro seismic vibrations from the precursory signal can resonate with the oscillations of the spring-loaded balance wheel, thereby interrupting its natural rhythm. The clock is the "detector" and "amplifier." Detection of an earthquake precursory signal is noted by an increase or loss of time. One need only log daily readings to detect the precursory micro-seismic vibrations.

For example, over each individual swing of the spring-loaded balance wheel, a miniscule interruption can take place that would normally go unnoticed. However, the clock can store each interruption, and after tens of thousands of swings (which would take place over night for example) a buildup of these interruptions can become noticeable. For example, the clock may change plus or minus five minutes or more over night.

For example, approximately two weeks before the 6.7 magnitude Northridge earthquake in January, 1994, a clock, normally accurate time to within plus or minus two or three minutes per week, began losing approximately five minutes each day. After several weeks of aftershocks had eventually subsided the clock returned to its normal time keeping.

In some examples, worldwide coverage can be accomplished by observing the effect of micro-seismic surface waves created by an earthquake. Micro-seismic surface waves are capable of reaching great distances. The dispersion phenomenon is common to surface waves. To detect micro-seismic surface waves from distant earthquakes, a user can adjust a clock to a faster rate of speed.

A spring-loaded balance wheel (oscillating seismometer) concept is a momentous break through that signals a new technological transition which will lead to the exploration and discoveries in here-to-for unimaginable areas of research.

Instructions on how to use:

In the practice of this discovery, one simply has to know how to tell time. Most mechanical clocks like the inexpensive alarm clocks sold at K-Mart™, Walmart™, Target™, etc. will do.

In some examples, reading is more accurate and sensitive with the second hand removed. It also helps to remove or disengage any extra bells, whistles, etc that are not part of the basic unit.

Detecting precursors from a local earthquake normally requires a clock running on time. Due to frequency dispersion, as surface waves travel outward from an epicenter, the rings are closer together. Thus, the frequency required for detecting these outer seismic waves will have to be higher than they were at the epicenter. For example a clock set to detect local precursors in New Guinea would normally be set to run on time. However, a clock in Southern California set to detect precursors in and around the area of New Guinea would have to be set to operate in the vicinity of 30 to 40 minutes fast each day.

To detect distant earthquakes, the Seismic Wave Receiver may be oriented in a particular direction. The method of directing these sensors is similar to speaker placement or location for good base reproduction, in a corner or up against the wall, etc. A clock can be placed in the corner of a room, acting as a corner reflector. A yard stick from each wall works well. In some examples, the clock can be placed about ten feet in front of a brick or block wall. Here again the wall should be broadside to the area you are trying to detect. You will have to experiment for best results. In at least one implementation, a large wall (of an apartment complex) approximately 30 to 40 feet behind the Seismic Wave Receiver facilitated readings.

However, if an earthquake with a magnitude in the area of 8.0 or greater strikes anywhere in the world, a precursory may be detected regardless of how the clock might be directed. A strong quake in the focal area can have result in a continuation of these indications for a week or more.

Several clocks may be required for detecting earthquake precursory signals because not all clocks provide the information you may be looking for. In some examples, some clocks can detect warning signals from some areas, and other clocks can detect warning signals from other areas. Similarly, some clocks can detect from a lesser area, while some detected from a greater area.

Southwestern California, because of its location on the Pacific Tectonic Plate, has a ring side seat, so to speak, for monitoring precursors from quakes that strike in the Southwest Pacific since of the many quakes in that area, a good percentage of them strike on the Pacific Plate side of that boundary which is essentially in the seismic neighborhood of Southwestern California.

Figure 3:
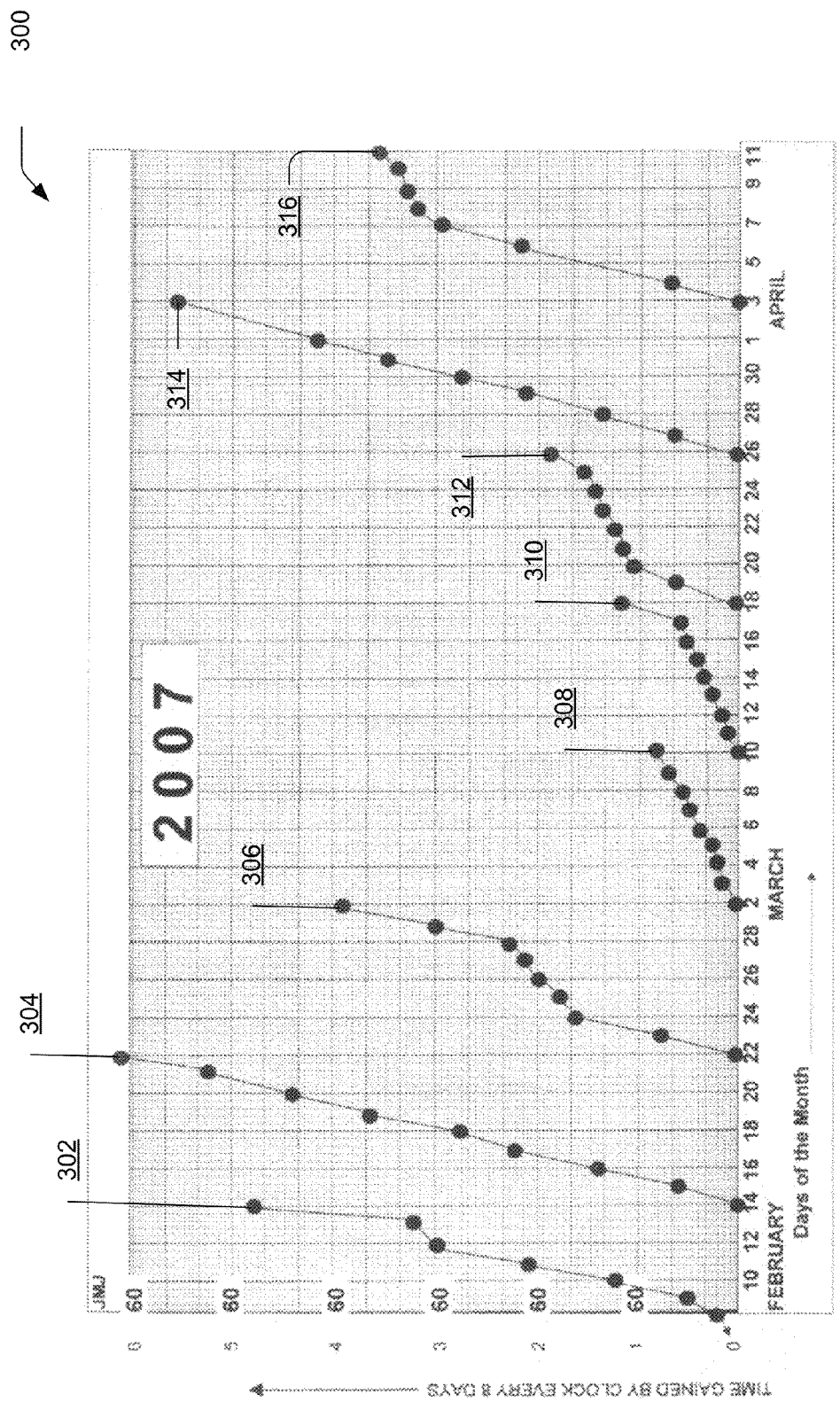
FIG. 3 illustrates a graphical representation of time changes in a clock of a Seismic Wave Receiver.

FIG. 3 illustrates a graphical representation of time changes in a clock on a Seismic Wave Receiver. Lines 302, 304, 306, 308, 310, 312, 314, and 316 depict time gained by a clock between February and April, 2007, in eight-day increments. The base of each line, such as line 304, depicts the clock being wound and reset to a baseline.

In the illustrative example, line 306 represents the time gained by the clock beginning Feb. 22 and Mar. 2, 2007. On Feb. 25, 2007, 35 days prior to an 8.1 magnitude earthquake in the Solomon Islands, the clock speed dropped abruptly. As depicted, the clock speed dropped from a gain of approximately 40 minutes per day to a gain of approximately 4 to 10 minutes per day. The change in clock speed lasted until March 25th, almost uninterrupted, due to the additional eruption of the Vanuatu 7.1 magnitude quake on March 24 and the many very large aftershocks which followed.

Figure 4:
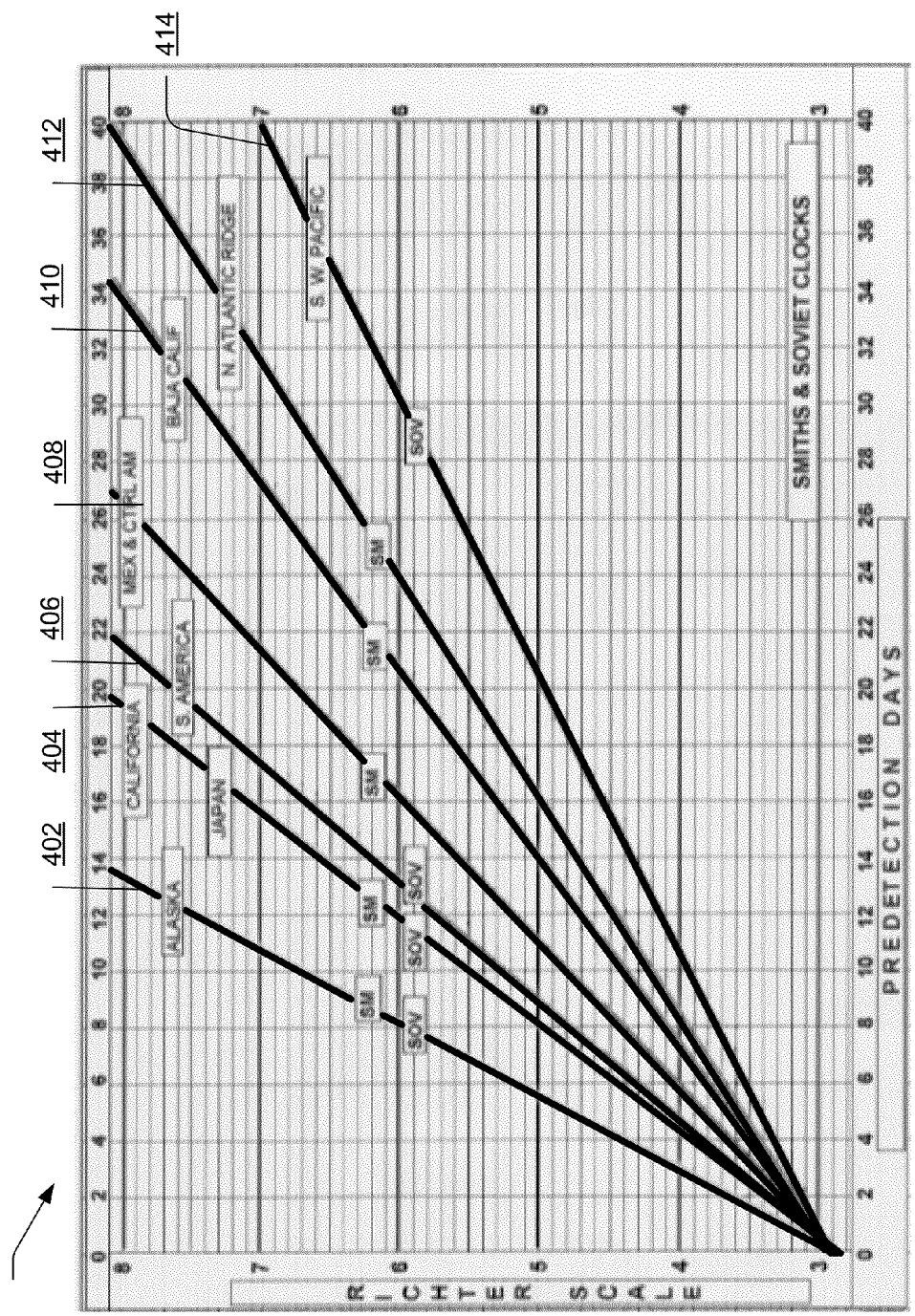
FIG. 4 illustrates a graphical representation of the pre-detection in days of various earthquakes around the world on two Seismic Wave Receivers (Smith-SM & Soviet-SOV).

FIG. 4 illustrates a graphical representation of the pre-detection in days of various earthquakes around the world on two Seismic Wave Receivers (Smith-SM & Soviet-SOV). Each line 402, 404, 406, 408, 410, 412, 414 depicts a different region in which earthquakes have been detected.

NOTE: Ample warning of several weeks, is normally, given for large magnitude earthquakes.

The greater the earthquake magnitude, the longer the warning period provided.

As measured in time change on a clock, distant earthquakes in the Southwest Pacific produce a much longer warning period than do local quakes in California. This may vary depending on the type of clock.

Clocks that detect local precursors normally require a clock that runs on time. Because of dispersion, precursors from distant earthquakes require a faster clock; the further the distance the faster the clock required.

For example, Japan located on the Eurasian Plate with a plate boundary of great depth that separates the Eurasian Plate and the Pacific Plate, is not easily detected from California.

The area from which most detections take place is in the Southwest Pacific for the following reasons:

This is a region that is impacted by frequent earthquakes. Many earthquakes in this area hit on the Pacific Plate side of the plate boundary, on which the Southwestern part of California is also located.

Clocks of all sizes seem to work, wrist watches, pocket watches alarm clocks, wall clocks, etc.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claim.

What is claimed is:

1. A method for detecting earthquake precursory signals comprising:
    oscillating a spring-loaded balance wheel;
    running a clock, the clock being operatively connected to the spring-loaded balance wheel;
    receiving a plurality of miniscule interruptions in the oscillation of the spring-loaded balance wheel, the plurality of miniscule interruptions based at least in part on one or more precursory seismic vibrations; and
    determining a time change in the clock based at least in part on the plurality of miniscule interruptions.

2. A method as claim 1 recites, wherein the method for detecting earthquake precursory signals further comprises plotting the time change in the clock at least once per day.

3. A method as claim 1 recites, wherein the determining the time change in the clock based at least in part on the plurality of miniscule interruptions comprises identifying one or more periods where a rate of time gained by the clock changes.

4. A method as claim 1 recites, wherein the method for detecting earthquake precursory signals further comprises predicting an earthquake based at least in part on the determined time change.

5. A method as claim 1 recites, wherein the method for detecting earthquake precursory signals further comprises:
    detecting a length of the one or more precursory seismic vibrations; and
    determining the magnitude of an earthquake based at least in part on the length of the one or more precursory seismic vibrations.

6. A method as claim 1 recites, wherein the method for detecting earthquake precursory signals further comprises adjusting the oscillation frequency of the spring-loaded balance wheel.

7. A method as claim 1 recites, wherein the method for detecting earthquake precursory signals further comprises providing a warning in advance of an earthquake based at least in part on the amount of time gained by the clock.

8. An earthquake detection device comprising:
    a spring-loaded balance wheel, the spring-loaded balance wheel configured to oscillate and capable of receiving a plurality of miniscule interruptions in the oscillation, the plurality of miniscule interruptions based at least in part on one or more precursory seismic vibrations;
    a running clock, the clock being operatively connected to the spring-loaded balance wheel; and
    a printer, the printer being operatively connected to the clock and configured to plot an amount of time gained by the clock.

9. An earthquake detection device as claim 8 recites, wherein the oscillation is in a frequency range of 1 to 10 Hz.

* * * * *